US006944765B1

(12) United States Patent
Rose et al.

(10) Patent No.: US 6,944,765 B1
(45) Date of Patent: Sep. 13, 2005

(54) METHOD OF AUTHENTICATION ANONYMOUS USERS WHILE REDUCING POTENTIAL FOR "MIDDLEMAN" FRAUD

(75) Inventors: Gregory G. Rose, San Diego, CA (US); Philip M. Hawkes, Burwood (AU)

(73) Assignee: Qualcomm, Inc., San Diego, CA (US)

( * ) Notice: Subject to any disclaimer, the term of this patent is extended or adjusted under 35 U.S.C. 154(b) by 0 days.

(21) Appl. No.: 09/468,557

(22) Filed: Dec. 21, 1999

(51) Int. Cl.[7] ............................................. H04L 9/00
(52) U.S. Cl. ..................... 713/181; 713/188; 713/152; 713/153; 713/168; 380/30; 380/201; 380/251; 380/262; 705/51; 705/57; 705/67
(58) Field of Search ................................ 713/181, 188, 713/152, 153, 168; 380/30, 251, 201, 262; 705/51, 67, 57

(56) References Cited

U.S. PATENT DOCUMENTS

| | | | | |
|---|---|---|---|---|
| 5,241,599 A | * | 8/1993 | Bellovin et al. | ............ 713/171 |
| 5,311,596 A | * | 5/1994 | Scott et al. | .................... 380/33 |
| 5,724,425 A | * | 3/1998 | Chang et al. | ................. 705/52 |
| 5,768,382 A | * | 6/1998 | Schneier et al. | ............ 380/251 |
| 5,796,952 A | * | 8/1998 | Davis et al. | ................. 709/224 |
| 5,841,870 A | * | 11/1998 | Fieres et al. | ................ 713/156 |
| 5,917,615 A | * | 6/1999 | Reifman et al. | ............ 358/468 |
| 5,970,143 A | * | 10/1999 | Schneier et al. | ............ 713/181 |
| 6,141,010 A | * | 10/2000 | Hoyle | ......................... 345/854 |
| 6,148,083 A | * | 11/2000 | Fieres et al. | ................ 380/255 |
| 6,151,676 A | * | 11/2000 | Cuccia et al. | ............... 713/176 |
| 6,301,660 B1 | * | 10/2001 | Benson | ....................... 713/165 |

OTHER PUBLICATIONS

Menezes, Alfred, Paul van Oorschot, and Scott Vanstone, The Handbook of Applied Cryptography, 1996, pp. 402–403.*

Merkle, Ralph C. "Secure Communications Over Insecure Channels" Communications of the ACM 21(4): 294–299 (1978).

Rivest, et al. "Time–Lock Puzzles and Timed–Release Crytpo" pp. 1–8 (Feb. 21, 1996).

Back, Adam "Hash Cash–A Partial Hash Collision Based Postage Scheme" pp. 1–5. (printed from website www-.cypherspace.org/~adam/ on Apr. 25, 2000).

* cited by examiner

Primary Examiner—Andrew Caldwell
Assistant Examiner—Paul Callahan
(74) Attorney, Agent, or Firm—Phil Wadsworth; Sandip (Micky) S. Minhas; Jae-Hee Choi

(57) ABSTRACT

A method of authenticating anonymous users while reducing potential for "middleman" fraud includes the step of constructing a puzzle in response to information received from a software user. The puzzle includes the received information. The puzzle is sent to the user by a software provider. The user solves the puzzle and returns the solution to the provider. The puzzle includes a portion of a value derived from an encrypted "cookie" and an exponentiation of the derived value. The cookie includes information about the user.

3 Claims, 1 Drawing Sheet

METHOD OF AUTHENTICATION ANONYMOUS USERS WHILE REDUCING POTENTIAL FOR "MIDDLEMAN" FRAUD

BACKGROUND OF THE INVENTION

I. Field of the Invention

The present invention pertains generally to the field of encryption, and more particularly to methods for authenticating anonymous users that reduce the potential for "middleman" fraud.

II. Background

Computer software is generally distributed over the Internet to end users (i.e., consumers) by distribution agents, or "middlemen." There are thus three parties involved in the transaction. The first is the provider of software and content (i.e., the author), who derives revenue from providing content to end users and pays a small commission to distribution agents to promote and distribute the software. The second is one of a number of distribution agents who provides the software (which provides a mechanism to view the content, as well as some value independent of the content, such as, e.g., electronic mail functions) to the user. The middleman derives revenue from users who receive content, so it is in his or her interest to distribute the software widely. The third is the user, who gets the software for free in return for viewing the content. The user gets no other remuneration, mainly because the users are anonymous. The users are anonymous because tracking details are generally not kept and the users have not been individually identified. Users might volunteer information when requesting content, but such volunteered information is generally used and discarded rather than being stored or tracked. The parties are hereinafter referred to generally as the provider, the middleman, and the user.

The middleman may use a device known as an Internet "cookie" to obtain demographic information about users when the users connect to the Internet and visit the appropriate website. For example, when a user connects to certain Internet locations, the user's computer connects through the Internet to a host computer operated by the middleman. The host sends a small data file (the cookie) that is saved by the user's computer. As the user and the host communicate, some data is stored in the cookie. When the user disconnects, the cookie remains in his or her computer. Subsequent data about the user's Internet use is stored in the cookie. The next time the user connects to the host, the host reads the cookie for information about the user. The user's information may be compiled by the host operator and sold to Internet marketers.

Because the users are anonymous, the middleman can commit undetectable fraud on the provider simply by passing through more content. This, in turn, can be accomplished either by requesting more content on behalf of a real user, or by creating "fake" users. There are a number of well-known statistical methods for tracking the rate of the content delivery to particular users while keeping the details anonymous. Such statistical methods solve the problem of middlemen committing fraud by requesting more content on behalf of a real user. However, these methods are not directed to the situation in which the middleman commits fraud by creating a significant number of fake users. Thus, there is a need for a method of preventing software distribution agents from impersonating a significant number of nonexistent users to commit fraud.

SUMMARY OF THE INVENTION

The present invention is directed to a method of preventing software distribution agents from impersonating a significant number of non-existent users to commit fraud. Accordingly, in one aspect of the invention, a method for a provider of software to authenticate users of the software is provided. The method advantageously includes the steps of constructing a puzzle in response to information received from a user, the puzzle including the information; sending the puzzle to the user; and returning a solution to the puzzle to the provider.

In another aspect of the invention, an apparatus for enabling a provider of software to authenticate users of the software is provided. The apparatus advantageously includes means for constructing a puzzle in response to information received from a user, the puzzle including the information; means for sending the puzzle to the user; and means for returning a solution to the puzzle to the provider.

In another aspect of the invention, an apparatus for enabling a provider of software to authenticate users of the software is provided. The apparatus advantageously includes a processor; and a processor-readable storage medium accessible by the processor and containing a set of instructions executable by the processor to construct a puzzle in response to information received from a user, the puzzle including the information, and send the puzzle to the user.

In another aspect of the invention, a method of preventing a person from impersonating a plurality of users of software is, provided. The method advantageously includes the steps of constructing a plurality of puzzles, each puzzle having a solution that includes information about a respective one of the plurality of users, each puzzle requiring consumption of a resource to solve; and sending each puzzle to a respective one of the plurality of users for solution.

DETAILED DESCRIPTION OF THE PREFERRED EMBODIMENTS

In the embodiments described below, new users of a system are registered in a way that uses up a scarce resource, so that an individual user will register and not notice the cost, but any party, and in particular a middleman, would incur significant costs in any attempt to misuse the system. In one embodiment the significant resource is computation time. Other scarce resources could be used, such as, e.g., storage space, network bandwidth, or user attention span (i.e., requiring a user to interact for a period of time). Computation time is preferred because it is essentially free to the user. Generally the user's personal computer is idle most of the time, the computation can be performed in a non-intrusive manner, and there is no ongoing overhead once the computation is complete. The exact amount of computation can be adjusted according to parameters such as the cost and computing power of typical computers at the time, and the amounts involved in potential fraud.

Figure 1:
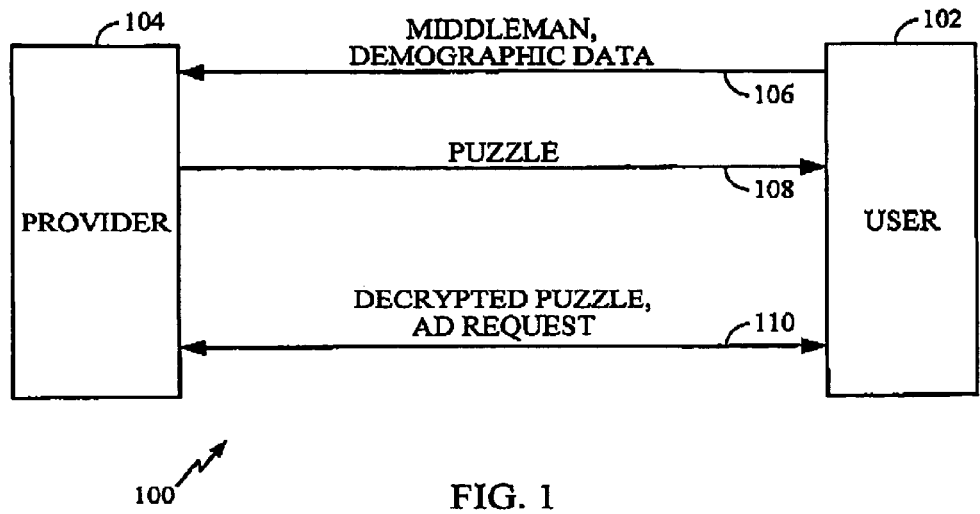
FIG. 1 is a block diagram of a system in which information is exchanged between a provider and a user.

A system 100 in which a user 102 requests registration by communicating to a provider 104 is illustrated in FIG. 1 in accordance with one embodiment. It should be understood that the user 102 and the provider 104 refer to machines used by the user and the provider, such as, e.g., personal computers or handheld computing devices such as personal digital assistants or wireless telephones for the user 102, up to large Web servers for the provider 104. In a message the user 102 sends demographic data to the provider 104. In other embodiments the user 102 may send other data such as, e.g., user identity instead of or along with the demographic data in the message. The message to the provider 104 may or may not be in an encrypted format to protect sensitive information about the user 102. The software on the user 102 includes some identifier of the middleman, which, in turn, is also included in the message 106. The user 102 may also provide information to better target content material subsequently. The data 106 provided by the user 102 will be encoded by the provider 104 into the answer to a puzzle 108. The answer, i.e., the decrypted puzzle 110, will be communicated back to the provider 104 by the user 102 at a later time when the user requests content.

In one embodiment the answer 110 to the puzzle is constructed as follows. The information 106 provided, and a random identifier (not shown) of sufficient length to assume uniqueness, are placed in a buffer (also not shown). A cryptographically secure hash function of the contents of the buffer is computed. An exemplary secure hash function is the Secure Hash Standard specified in Federal Information Processing Standard (FIPS) 180-1, produced by the National Institute for Standards and Technology. The algorithm described in the FIPS 180-1 document is hereafter referred to as the Secure Hash Algorithm (SHA). The result of the hash function may be 160 bits in length. In a particular embodiment, only the first sixty-four bits of the hash function are used. In another embodiment the first eighty bits of the hash function are used. The hash function is inserted into the buffer at the beginning of the buffer. The entire buffer is then encrypted with a symmetric block cipher such as, e.g., the Data Encryption Standard (DES) algorithm (FIPS 46-2), using a key-held secret (not shown) in the provider 104. In a particular embodiment, the triple-DES (3DES) algorithm as specified in the draft text of FIPS 46-3 is used.

To everyone except the provider 104, the result of the encryption is advantageously indistinguishable from random data. In particular, even if some of the data is made public, no party can reconstruct the part that is not exposed. When the provider 104 subsequently receives the encrypted item, the provider 104 can be assured that it is exactly the data that the provider 104 created at an earlier time by decrypting it and verifying that the hash function embedded in it agrees with the result of a new computation. The encrypted buffer of data is commonly referred to as a "cookie" by those skilled in the art. It should be understood that the cookie will be longer than a single cipher block, so the encryption should be done in Cipher Block Chaining mode, as described in FIPS. Cipher Block Chaining mode normally requires a random Initialization Vector. However, the initialization vector can be set to a constant zero value because the first block to be encrypted contains a hash value, which is sufficient to thwart expected attacks.

The puzzle 108 is constructed from the cookie instead of transmitting the cookie itself. The puzzle 108 is advantageously constructed such that a certain (i.e., expected) amount of computation is required to solve the puzzle 108 and recover the cookie. Because the provider 104 has to perform this function for many users, the provider 104 must be computationally efficient to construct the puzzle 108 while also being intentionally inefficient to solve the puzzle 108. This combined computational construction efficiency and solution inefficiency can be accomplished with a novel use of known public-key cryptographic methods.

For purposes of the following discussion, the cookie may be denoted C, and additional parameters P and g are embedded in the software and hence known to all participants. The parameter P is advantageously a large prime number. The lower bound on the number of bits in P is constrained by the desired computational complexity of the puzzle 108. In a particular embodiment the number of bits in P is 1024. The parameter P advantageously has the additional property that a parameter Q, which satisfies the equation $Q = (P-1)/2$, is also prime. The parameter g is advantageously a generator of the subgroup of order Q of the multiplicative group of integers modulo P. The parameters P, g, and Q are typical parameters used for the well-known Diffie-Hellman key agreement protocol. If the cookie, C, is larger than Q, the user 102 will be given some of the cookie plainly, and a smaller part will be used to construct the puzzle 108. It is generally assumed hereinthat $|C|<|Q|$.

The puzzle 108 is first constructed by computing $Z = g^k$ modulo P. Currently, the best known method for computing K given Z (i.e., for solving the Discrete Logarithm Problem) is computationally expensive, and with a 1024-bit length for P, is considered to be roughly equivalent to decrypting a message using a block cipher with an unknown key of 128 bits. Such a computation is too extensive for the user 102 to perform. Because the user 102 is supposed to be able to recover C, the provider 104 gives the user 102 most of the answer 110. The puzzle 108 thus includes Z and a puzzle hint. The puzzle hint includes most (but not all) of the information about C. The number of bits of variability in the value transmitted determines the difficulty of the puzzle 108. The most efficient way for the user to solve the puzzle 108 is to try out guesses for the unknown information until the user finds the guess that yields the correct answer 110. Checking each guess requires computing the modular exponentiation function for the candidate K.

It can be assumed that computing such a modular exponentiation takes about $1/100^{th}$ of a second (the actual time depends on the speed of the processor (not shown) and the size of P). If it is desired that the computation take an average of twelve hours of background processing time, approximately four million (or $2^{22}$) trial candidates must be used. Because, on average, the solution will be found about half way through the set of possibilities, the puzzle hint should consist of all but twenty-three of the bits of the answer 110.

To ensure that the puzzle 108 cannot be solved in some manner avoiding trial exponentiation, a one-way hash function may again be used. Suppose (as is the case for the Secure Hash Standard) that the output of the hash function H0 is 160 bits in length. It is important to ensure that $|C|$ is somewhat larger than $|H|/2$ so $|C|$ can be split into two parts. If necessary, C can be padded before encryption to ensure that $|C|$ is large enough. The result of the hash function is used in part to obscure C and in part to vary the input to the exponentiation operation.

An intermediate result K is constructed from C in the following manner. The cookie C is divided into two parts, L and R, such that $|R|$ is eighty bits in length. A random number r is chosen in the range $0, \ldots, N$, where N determines the average difficulty of the puzzle 108. In one embodiment $N = 2^{23}$. Then K is determined by the following equation: $K = L \| ((R \| 0_{80}) \oplus H(L \oplus r))$, where $\|$ denotes a concatenation operation, $\oplus$ denotes a bitwise Exclusive-Or (XOR) operation, and $0_{80}$ denotes eighty zero-bits.

It should be noted that in the particular embodiment being described, the result of a single hash function is advantageously split into two parts and used for independent purposes. It would be readily apparent to one of skill in the art that two independent hash functions could be used for these purposes.

The puzzle 108 then consists of the exponentiation result Z and all but the last eighty bits of K. To recover C and solve the puzzle 108, the user starts trying values of r, calculating H(L∥r), appending eighty bits of the result to the given part of K, and checking whether the resulting $g^k$ is equal to the answer Z. When the correct r is found, the left eighty bits of the hash output may be XORed with the partial K to recover C.

Hence, the above-described technique satisfies the requirements as stated. The possible solutions of the discrete logarithm problem vary in 160 bits, far too many for any form of precomputation to be useful. Eighty bits of C are obscured until K can be verified by trial exponentiation. Eighty bits of K are not revealed until they are derived from r. Because K depends on L, there is no way to precompute the limited set of useful hash values. The range of the random number r determines the average time to solve the puzzle 108 by trial and error, while the above properties ensure that other shortcuts do not work.

It would be readily apparent to one of skill in the art that the puzzle 108 could also be solved by sending tries to the provider 104 and waiting for an acknowledgment. The accompanying protocol should ensure that this is not more efficient than performing the modular exponentiation (which, in practice, will be satisfied).

Once the user has solved the puzzle 108, the user is in possession of a valid cookie that contains enough information to subsequently convince the provider 104 that the user has registered. The cookie also carries any ancillary data required by the provider 104 to determine the content.

It should be understood that some of the information in the initial registration request 106 is potentially privacy-sensitive. Similarly, when the cookie is returned to the provider 104 for subsequent content requests, an eavesdropper could track the requests based on the cookie. Therefore, it is desirable that the communication 106 from the user to the provider 104 be encrypted, and it is relatively easy to accomplish such an encryption using a discrete-logarithm-based, public-key encryption algorithm such as, e.g., the Diffie-Hellman algorithm. The public key of the provider 104 could be embedded in the application, and the common P and g parameters could be used. Nevertheless, it would be understood by those of skill in the art that the message from the user to the provider 104 need not be encrypted, and that in the event the communication 106 is encrypted, any public-key encryption algorithm could be used.

In one embodiment an encrypted cookie is created and then decrypted, and a puzzle is created from the encrypted cookie and then solved, as described below and with reference to FIG. 2. In accordance with this particular embodiment, the external environment is as follows. Certain data and functionality are assumed to be present in the calling environment. In particular, more functionality is required from the provider than from the user.

The primary common parameters of the puzzle system are P, which is 1024 bits in length and prime, and g, a generator whose value is two. The prime, P, is given by $2^{1024}-2^{960}-1+2^{64}*\{[2^{894}\pi]+129093$. exadecimal value of P is the following:

FFFFFFFF FFFFFFFF C90FDAA2 2168C234 C4C6628B 80DC1CD1 29024E08 8A67CC74 020BBEA6 3B139B22 514A0879 8E3404DD EF9519B3 CD3A431B 302B0A6D F25F1437 4FE1356D 6D51C245 E485B576 625E7EC6 F44C42E9A637ED6B 0BFF5CB6 F406B7ED EE386BFB 5A899FA5 AE9F2411 7C4B1FE649286651 ECE65381 FFFFFFFF FFFFFFFF.

The following common functionality is advantageously used. Both the user and the provider 104 require access to an SHA-1 hash algorithm and a long integer modular exponentiation function. The SHA-1 hash algorithm, which is denoted H(.), advantageously produces 160-bit results from any input, regardless of the length of the input. The long integer modular exponentiation function implicitly references g and P above, and efficiently calculates $g^x$ modulo P for a given value x. Other long integer modular arithmetic functions, such as, e.g., addition, multiplication, etc., may be used instead in the implementation of the modular exponentiation functionality.

The following provider-side-only parameters and functionality are advantageously employed. In addition to the above-described common functionality requirements, the provider additionally requires the ability to create and verify cookies in a cryptographically secure manner. To do this, the provider requires the following items: (1) the 3DES encryption algorithm; (2) an authentication key Ka; (3) a key Kp used to encrypt cookies; and (4) a source of high-quality secret pseudo-random numbers. In one embodiment the authentication key Ka is 128 bits in length. It should be understood that encryption algorithms other than the 3DES encryption algorithm may be employed. In the embodiment in which the 3DES encryption algorithm is used, the key Kp for encrypting cookies should advantageously be 112 bits in length.

In accordance with this particular embodiment, an encrypted cookie may be created as follows. In the specific embodiment described, the cookie is a byte buffer. The maximum length of the input cookie is assumed to be limited by the 1024-bit length of the prime P plus eighty bits that will eventually be appended. The cookie is padded with one or more octets to be a multiple of eight octets, and has eight octets of authentication information prepended. With the eighty additional bits that are appended, the length of the cookie must remain less than 1023 bits. Therefore, in this particular embodiment, the input cookie must be at most 101 octets, or 808 bits, in length. It would be understood by those of skill in the art that longer cookies can be handled with slight modifications if required. The cookie should advantageously have a minimum length of eight octets. The following pseudo-code parameters may be applied to encrypt a cookie in accordance with this specific embodiment:

```
void encryptCookie(
    const unsigned char *cookie,
    int cookieLength,
    unsigned char *encryptedCookie
);
```

In the above pseudo-code parameters, the parameter cookie points to a buffer with cookieLength (at most 101) octets of information. The parameter encryptedCookie points to a buffer with at least ((cookieLength +16) & 0xF8) octets of space available, which will be overwritten with the result. The global information used includes the parameters Ka and Kp.

The following method steps may be used to encrypt a cookie in accordance with this specific embodiment. First, the SHA hash H(Ka, cookie) is calculated and then truncated to eight octets. The truncated hash is then copied into a file called encryptedCookie. Second, a file called cookie is appended into the encryptedCookie file. Third, the number of octets of padding required, 1<=n<=8, is calculated, and then the number of octets that contain the value n are appended. This third method step can be unambiguously reversed. Fourth, the encryptedCookie file is encrypted using the 3DES encryption algorithm with the key Kp in Cipher Block Chaining (CBC) mode and an Initialization Vector of zero.

In accordance with this particular embodiment, an encrypted cookie may be decrypted by using the following pseudocode parameters:

```
int decryptCookie(
    const unsigned char *encryptedCookie,
    int cookieLength,
    unsigned char *cookie
);
```

In the above pseudo-code parameters, the file encryptedCookie points to a buffer with cookieLength (at most 112) octets of information. The file cookie points to a buffer with at least (cookieLength −8) octets of space available, which will be overwritten with the result. The return value is the length of the decrypted cookie if the authentication succeeds. Otherwise, the return value is zero. The global information used includes the parameters Ka and Kp.

The following method steps may be used to decrypt an encrypted cookie in accordance with this specific embodiment. First, a file called encryptedCookie is copied into a temporary buffer and then decrypted using the 3DES encryption algorithm with the key Kp in CBC mode and an Initialisation Vector of zero. Second, the SHA hash H(Ka, buffer+8) is calculated after removing padding. The SHA hash is then truncated to eight octets. Third, the eight-octet output is compared with the first eight octets of the buffer. The value zero is returned if the two compared sets of eight octets are unequal. Fourth, if the comparison is equal, the temporary buffer plus eight octets is copied to the cookie file, and the unpadded length of the cookie file is returned.

Figure 2:
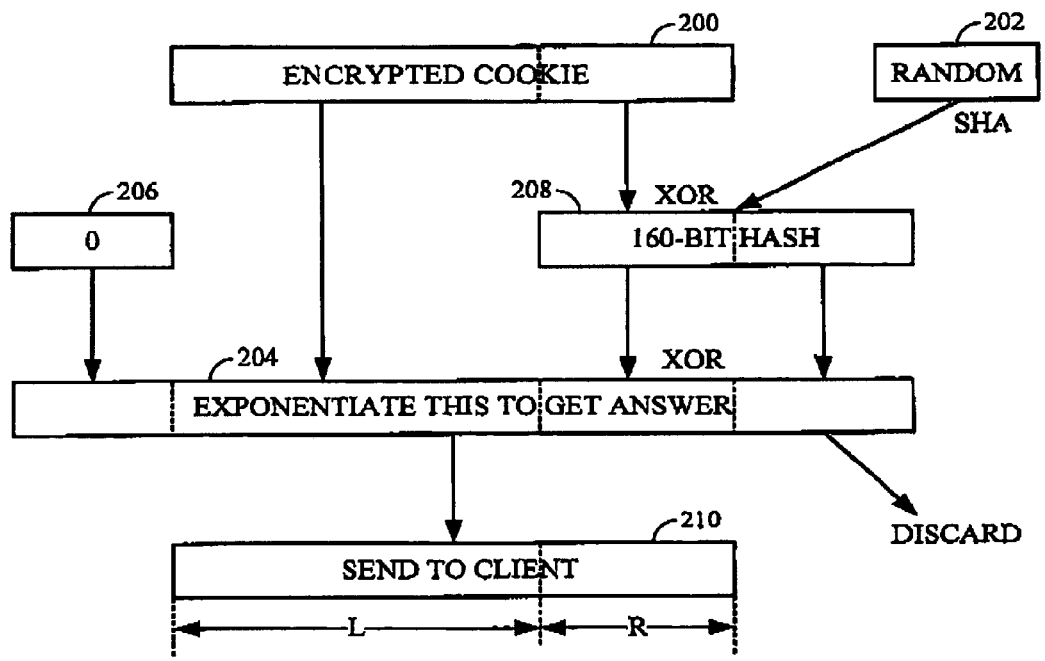
FIG. 2 is a block diagram illustrating the fit of bits of an encrypted "cookie" into an exponentiation operation of a "puzzle."

In accordance with this particular embodiment, a puzzle may be created from an encrypted cookie as illustrated in FIG. 2. An encrypted cookie 200 is conceptually partitioned into left (L) and right (R) components. The right component is eighty bits in length. A random number generator 202 pseudo-randomly selects a number in the range from zero to $2^{23}$. The encrypted cookie 200 is copied into a 1024-bit buffer 204 and padded on the left with zeros 206 and padded on the right with ten octets of zeros (eighty zero bits). A 160-bit, SHA hash 208 is performed on the concatenation of the left component of the encrypted cookie 200 and the random number selected by the random number generator 202. The result of the hash function 208, which is twenty octets in length, is bitwise XORed into the rightmost twenty octets of the buffer 204, modifying the rightmost ten octets of the encrypted cookie 200 and ten octets of zeros. The buffer 204 is exponentiated to produce an exponentiated result Z. The exponentiated result Z is sent to the user, or client, in the puzzle 210, which includes the result Z and all but the rightmost eighty bits of the buffer 204, which are discarded.

In accordance with one embodiment, the following pseudo-code structure may be used to create a puzzle from an encrypted cookie:

```
struct puzzle {
    int             difficulty;
    int             cookieLength;
    unsigned char   answer[128];
    unsigned char   encryptedCookie[cookieLength];
}
```

```
void makePuzzle(
    unsigned char *encryptedCookie,
    int cookieLength,
    int difficulty,
    struct puzzle *p
);
```

The input difficulty determines the size of the random number used, which in turn influences the expected number of trial exponentiations that need to be done to solve the puzzle. If difficulty is, for example, twenty, then on average $2^{19}$ hash calculations and trial exponentiations will need to be done by the user to break the puzzle. The input encrypted cookie has length cookieLength. This function returns after filling in the structure pointed to by p. The encryptedCookie in the structure is different from the input encrypted cookie, and will therefore fail to authenticate.

The encrypted cookie is conceptually split into two parts L and R, so that R is ten octets (eighty bits) long. A random number r is generated in the range $0..2^{difficulty}-1$. The encrypted cookie is then copied into a 1024-bit temporary buffer K, which is padded on the left with zeros, and padded with ten octets of zeros at the right end. A hash function of L, r is performed to produce a value h, which is twenty octets long. The value h is XORed into the last twenty octets of the buffer, modifying the last ten octets of the original encrypted cookie and the other ten octets of zeros. The temporary buffer K is treated as a 1024-bit integer and exponentiated to produce Z according to the following equation: $Z=g^K \mod P$. The pseudo-code structure is filled in by pointing to the appropriate fields according to the following pseudo-code steps:

p→difficulty=difficulty;
p→cookieLength=cookieLength;
p→answer=Z;
p→encryptedCookie=the middle part of K.

In accordance with one embodiment, a puzzle may be solved by calling a software routine denoted solvePuzzle. The puzzle solution function must be called repeatedly to actually solve the puzzle. Each call performs one trial exponentiation. The calling program is advantageously given the responsibility for functions such as, e.g., creating background threads, saving the intermediate state periodically, etc., as would be understood by those skilled in the art. The following pseudo-code structure completely defines the state of the search process, and is the information that needs to be saved and restored to continue:

```
struct puzzlestate {
    struct puzzle p;
    int             upto;
    unsigned char   intermediate[128];
};
``` int solvePuzzle(struct puzzlestate *s);

The solvePuzzle routine should return a value of one when the solvePuzzle routine has found the solution to the puzzle, in which case the encryptedCookie field of the puzzlestate structure will contain a valid encrypted cookie. While still searching, the solvePuzzle routine should return a value of zero. In the "impossible" case that the solvePuzzle routine has not found the valid encrypted cookie before searching the entire range, the solvePuzzle routine should return a value of negative one. Such a result could only occur in the case in which the transmission of the puzzle gets corrupted or there is a bug in the program at either the user end or the provider end.

It should be pointed out that before calling solvePuzzle for the first time, the user should copy the puzzle received from the provider into the above-shown puzzlestate structure. Also before calling solvePuzzle for the first time, the user should set the field upto to zero.

It should also be noted that it would be understood by those of skill in the art that various alternative methods could be used to solve the puzzle and verify the correctness of the cookie. One such method is the use of keyed message authentication codes.

It is important that the method used to solve the puzzle be efficient. Even though the goal is to use computer time, it is important that the time used should be unavoidable, and not subject to simple optimization. For this reason, the first call to solvePuzzle must calculate an intermediate result and save the result to avoid subsequent computation (which is certainly what someone who wanted to break the system would do). Because $g^{x+y}==g^x g^y$, it is possible to break the puzzle guess up into fixed and variable parts, and compute the exponentiation only on the smaller, variable part. In fact, by dividing (multiplying by the inverse) the answer by the fixed part, it is necessary only to exponentiate the 160-bit variable part and then compare to check whether the problem is solved.

In accordance with this particular embodiment, the puzzle may be solved by performing the following steps: First, if the upto field is zero, the intermediate field is initialized. The initialization procedure is performed by splitting the encryptedCookie field into left and right parts (L and R) such that R is ten octets long, and then calculating the multiplicative inverse of $(L*2^{160})$ and multiplying by the answer field to get the resultant value for the intermediate field. Second, a hash function is performed on the L and upto fields, and a 160-bit result is formed from R and the rightmost ten octets of the hash. Third, the 160-bit result is exponentiated to produce an exponentiation result. Fourth, the exponentiation result is compared to the value in the intermediate field. If the compared values are different, the upto field is incremented and a value of zero is returned. (Or, if the value of the upto field is greater than or equal to $2^{difficulty}$ (i.e., something has gone wrong), a value of negative one is returned.) Fifth, otherwise (i.e., if the compared values in the fourth step are the same), the leftmost eighty bits of the hash of L and upto are XORed into the rightmost bits of the encryptedCookie field (which is now correct), and a value of one is returned, indicating success.

Thus, a novel and improved method of authenticating anonymous users while reducing potential for "middleman" fraud has been described. Those of skill in the art would understand that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a digital signal processor (DSP), an application specific integrated circuit. (ASIC), discrete gate or transistor logic, discrete hardware components such as, e.g., registers and FIFO, a processor executing a set of firmware instructions, any conventional programmable software module and a processor, or any combination thereof. The processor may advantageously be a microprocessor, but in the alternative, the processor may be any conventional processor, controller, microcontroller, or state machine. The software module could reside in RAM memory, flash memory, ROM memory, registers, hard disk, a removable disk, a CD-ROM, or any other form of storage medium known in the art. Those of skill would further appreciate that the data, instructions, commands, information, signals, bits, symbols, and chips that may be referenced throughout the above description are advantageously represented by voltages, currents, electromagnetic waves, magnetic fields or particles, optical fields or particles, or any combination thereof.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. A method for a provider of software to authenticate users of the software, comprising the steps of:

constructing a puzzle in response to information received from a user, the puzzle including the information, wherein the constructing step comprises the steps of deriving a value from the information to produce a derived value, exponentiating the derived value to produce an exponentiated value, and combining the exponentiated value with a portion of the derived value;

sending the puzzle to the user;

returning a solution to the puzzle to the provider;

storing the information and a random number;

performing a hash function on the information and the random number to generate a fist hash result; and encrypting the first hash result;

wherein the deriving step comprises the steps of partitioning the encrypted hash result into first and second components, performing a hash function on a concatenation of the first component and the random number to generate a second hash result, appending a plurality of zero values to the second component to produce a lengthened second component, performing an exclusive-OR operation between the lengthened second component and the second hash result to generate an exclusive-OR result, and concatenating the first component and the exclusive-OR result to produce the derived value.

2. An apparatus for enabling a provider of software to authenticate users of the software, comprising:

means for constructing a puzzle in response to information received from a user, the puzzle including the information; wherein the means for constructing a puzzle further comprises means for deriving a value from the information to produce a derived value, means for exponentiating the derived value to produce an exponentiated value, and means for combining the exponentiated value with a portion of the derived value;

means for sending the puzzle to the user; and means for returning a solution to the puzzle to the provider;

means for storing the information and a random number;

means for performing a hash function on the information and the random number to generate a first hash result; and means for encrypting the first hash result;

wherein the means for deriving means for partitioning the encrypted hash result into first and second components, performing a hash function on a concatenation of the first component and the random number to generate a second hash result, appending a plurality of zero values to the second component to produce a lengthened second component, performing an exclusive-OR operation between the lengthened second component and the second hash result to generate an exclusive-OR result, and concatenating the first component and the exclusive-OR result to produce the derived value.

3. An apparatus for enabling a provider of software to authenticate users of the software, comprising:

a processor; and a processor-readable storage medium accessible by the processor and containing a set of instructions executable by the processor to construct a puzzle in response to information received from a user, the puzzle including the information, and sending the puzzle to the user;

wherein the puzzle is constructed by deriving a value from the information to produce a derived value, exponentiating the derived value to produce an exponentiated value, and combining the exponentiated value with a portion of the derived value; and wherein the set of instructions is further executable by the processor to store the information and a random number, perform a hash function on the information and the random number to generate a first hash result, and encrypt the first hash result, wherein the derived value is derived by partitioning the encrypted hash result into first and second components, performing a hash function on a concatenation of the first component and the random number to generate a second hash result, appending a plurality of zero values to the second component to produce a lengthened second component, performing an exclusive-OR operation between the lengthened second component and the second hash result to generate an exclusive-OR result, and concatenating the first component and the exclusive-OR result to produce the derived value.

* * * * *